(12) United States Patent
Tatsumi

(10) Patent No.: US 10,984,277 B2
(45) Date of Patent: Apr. 20, 2021

(54) IMAGE ANALYSIS APPARATUS, IMAGE ANALYSIS METHOD, AND NON-TRANSITORY COMPUTER READABLE MEDIUM

(71) Applicant: FUJI XEROX CO., LTD., Tokyo (JP)

(72) Inventor: Daisuke Tatsumi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 370 days.

(21) Appl. No.: 15/912,926

(22) Filed: Mar. 6, 2018

(65) Prior Publication Data
US 2019/0057276 A1    Feb. 21, 2019

(30) Foreign Application Priority Data
Aug. 16, 2017  (JP) .............................. JP2017-157278

(51) Int. Cl.
| | |
|---|---|
| *G06K 9/46* | (2006.01) |
| *G06K 9/32* | (2006.01) |
| *G06K 9/20* | (2006.01) |
| *G06T 7/10* | (2017.01) |

(52) U.S. Cl.
CPC ............ *G06K 9/46* (2013.01); *G06K 9/2063* (2013.01); *G06K 9/325* (2013.01); *G06K 9/3241* (2013.01); *G06T 7/10* (2017.01); *G06K 2209/01* (2013.01)

(58) Field of Classification Search
CPC ...... G06K 9/46; G06K 9/2063; G06K 9/3241; G06K 9/325; G06K 2209/01; G06T 7/10
USPC .......................................................... 358/1.1
See application file for complete search history.

(56) References Cited

U.S. PATENT DOCUMENTS

| | | | | |
|---|---|---|---|---|
| 5,168,533 | A * | 12/1992 | Kato ........................ | G06K 9/62 382/229 |
| 6,072,941 | A * | 6/2000 | Suzuki ............... | G06K 9/00456 358/1.11 |
| 2004/0145593 | A1* | 7/2004 | Berkner .................. | G06T 11/60 345/619 |
| 2010/0057434 | A1* | 3/2010 | Konno ................. | G06K 9/2063 704/3 |
| 2012/0223889 | A1* | 9/2012 | Medlock ............. | G06F 3/04886 345/168 |
| 2013/0259366 | A1* | 10/2013 | Tsugimura ........... | G06K 9/4652 382/164 |

(Continued)

FOREIGN PATENT DOCUMENTS

| | | |
|---|---|---|
| JP | H10-134144 A | 5/1998 |
| JP | 2001-092967 A | 4/2001 |
| JP | 3909697 B2 | 4/2007 |

*Primary Examiner* — Allen H Nguyen
(74) *Attorney, Agent, or Firm* — Oliff PLC

(57) ABSTRACT

An image analysis apparatus includes an extraction section, an acquisition section, an exclusion section, and a recognition section. The extraction section extracts, from a target image, a text area including a character. The acquisition section acquires a predetermined target-object condition. The predetermined target-object condition defines a target object. The exclusion section searches for the target object in the text area and excludes the target object from a target of character recognition. The text area is extracted by the extraction section. The target object satisfies the predetermined target-object condition. The recognition section performs character recognition on the text area. The text area is an area from which the target object is excluded.

19 Claims, 11 Drawing Sheets

(56) References Cited

U.S. PATENT DOCUMENTS

2014/0010459 A1\* 1/2014 Sumi .................. G06K 9/00221
 382/195
2017/0286737 A1\* 10/2017 Ozawa ................. G06K 7/1456
2017/0344583 A1\* 11/2017 Nakatsuka ................ G06T 9/00

\* cited by examiner

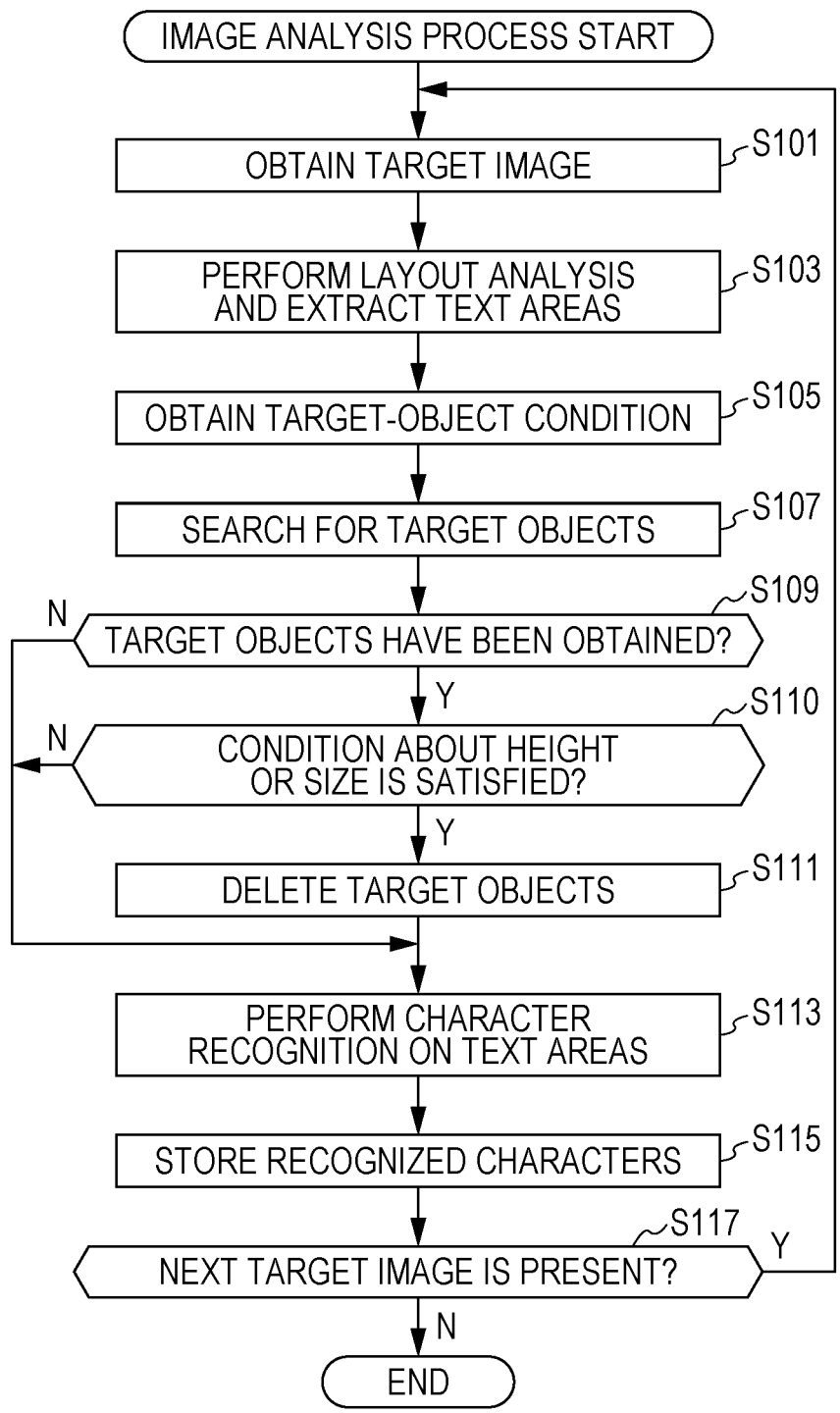

IMAGE ANALYSIS APPARATUS, IMAGE ANALYSIS METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-157278 filed Aug. 16, 2017.

BACKGROUND

Technical Field

The present invention relates to an image analysis apparatus, an image analysis method, and a non-transitory computer readable medium.

SUMMARY

According to an aspect of the invention, there is provided an image analysis apparatus including an extraction section, an acquisition section, an exclusion section, and a recognition section. The extraction section extracts, from a target image, a text area including a character. The acquisition section acquires a predetermined target-object condition. The predetermined target-object condition defines a target object. The exclusion section searches for the target object in the text area and excludes the target object from a target of character recognition. The text area is extracted by the extraction section. The target object satisfies the predetermined target-object condition. The recognition section performs character recognition on the text area. The text area is an area from which the target object is excluded.

BRIEF DESCRIPTION OF THE DRAWINGS

Exemplary embodiments of the present invention will be described in detail based on the following figures, wherein:

FIG. 14 is a flowchart of an image analysis process according to the second exemplary embodiment;

DETAILED DESCRIPTION

Exemplary embodiments of the present invention will be described in detail below by referring to the attached drawings.

First Exemplary Embodiment

Figure 1:
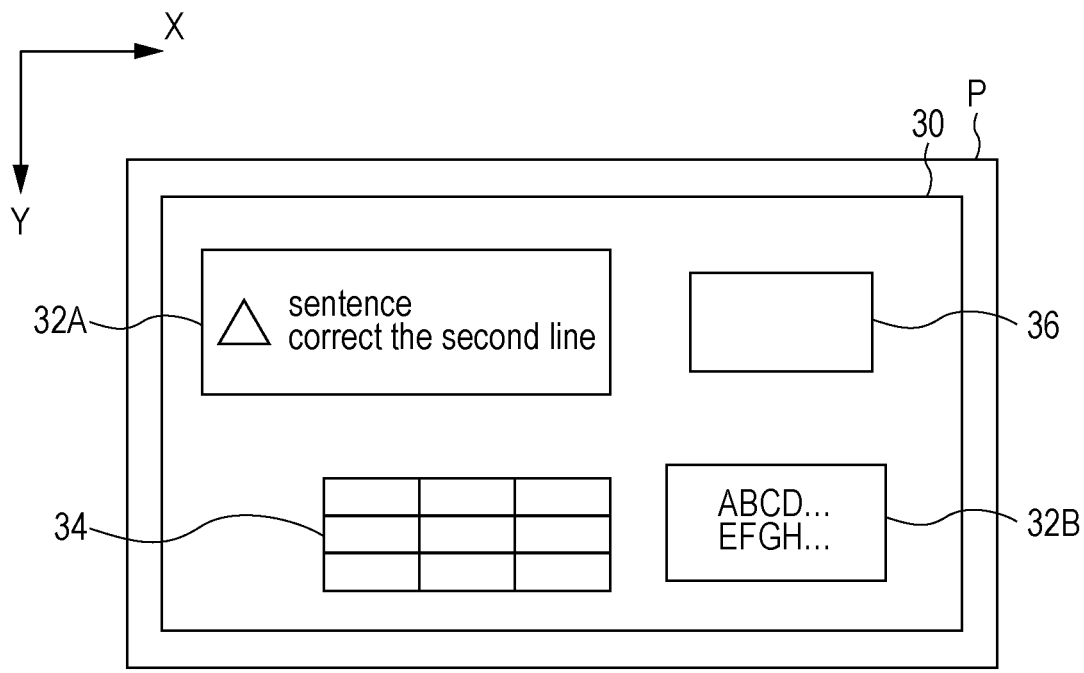
FIG. 1 is a front view of an exemplary sheet on which an image that is to be analyzed by an image analysis apparatus according to an exemplary embodiment is formed.

An image analyzed by an image analysis apparatus according to a first exemplary embodiment will be described. FIG. 1 is a front view of an exemplary sheet that is a recording medium on which an image to be analyzed by the image analysis apparatus according to the first exemplary embodiment is formed.

For example, as illustrated in FIG. 1, a line 30 for defining an entire image is drawn on a sheet P on which an image (for example, a design drawing) to be analyzed by the image analysis apparatus is drawn. In the first exemplary embodiment, the case in which the line 30 for defining the entire image is a rectangular figure frame will be described.

In the first exemplary embodiment, for example, the case in which, as illustrated in FIG. 1, text areas 32A and 32B that are areas including characters, a table area 34 that is an area including a table, an image area 36 that is an area including an image, and the like are arranged inside the line 30 for defining the entire target image will be described.

Figure 2:
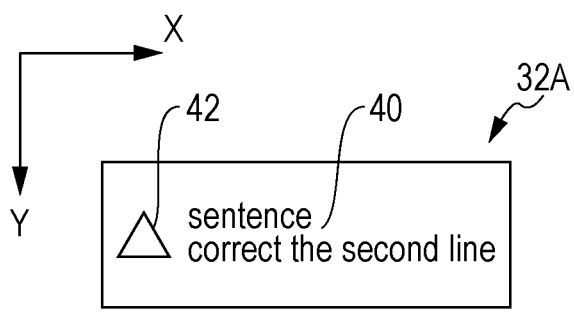
FIG. 2 is a front view of an exemplary text area according to an exemplary embodiment.

For example, as illustrated in FIG. 2, a text 40 in which "text" is arranged in the first line and in which "correct the second line" is arranged in the second line is described in the text area 32A. In the text area 32A, for example, a character, a symbol, or a figure (hereinafter referred to as a "target object") 42 which is not related to the text included in the image may be also described so as to be adjacent to the text 40 on the left side, that is, in the X direction, and so as to extend across the first and second lines.

In the first exemplary embodiment, the case in which the target object 42 has a triangular frame will be described. However, this is not limiting. The target object 42 may have, for example, a circular, elliptical, rectangular, or polygonal frame. The target object 42 may have no frames, and may be a symbol itself, such as a numeric character, an alphabet character, or a mark.

Examples of the type of the target object 42 include a symbol about a revision matter, a symbol indicating a geometrical tolerance for a shape or the like, a symbol indicating surface roughness, and a symbol indicating a caution-needed area.

Figure 3:
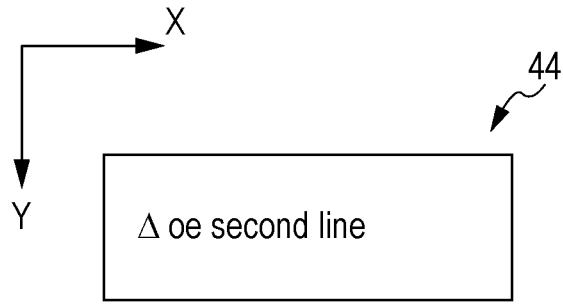
FIG. 3 is a front view of an exemplary result of character recognition of a text area, according to an exemplary embodiment.

The texts described in the text areas 32A and 32B are recognized by performing known character recognition processing. For example, as illustrated in FIG. 2, in the case where the target object 42 as well as the text 40 is described in the text area 32A, in character recognition of the text area 32A, the target object 42 may be falsely recognized as being a part of the text 40. In this case, the above-described two-line description of "text" and "correct the second line" may be falsely recognized to be a one-line description. Thus, for example, as illustrated in FIG. 3, a text area 44 which is a result of character recognition of the text area 32A and in which "Δ oe second line" is described may be obtained through false recognition.

Figure 4:
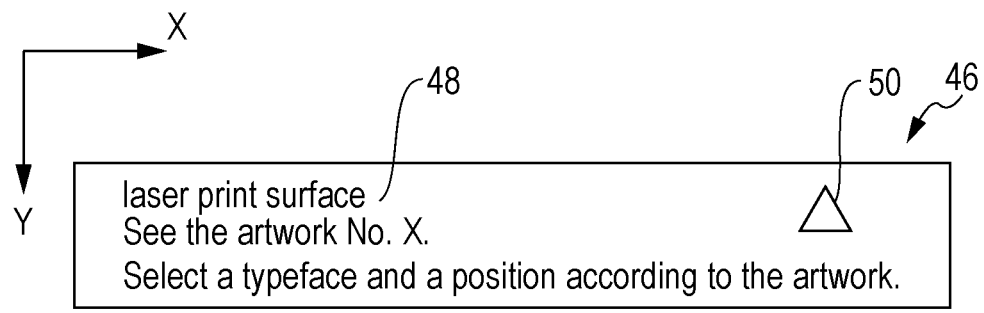
FIG. 4 is a front view of another exemplary text area according to an exemplary embodiment.

For example, as illustrated in FIG. 4, assume that a text 48 is described in a text area 46. In the text 48, "laser print surface" is arranged in the first line, "See the artwork No. X." is arranged in the second line, and "Select a typeface and a position according to the artwork." is arranged in the third line. In addition, assume that a target object 50 having a height (the length in the Y direction) equal to that of two lines of the text 48 is described on the right side of the text 48 so as to extend across the first and second lines of the text 48.

Figure 5:
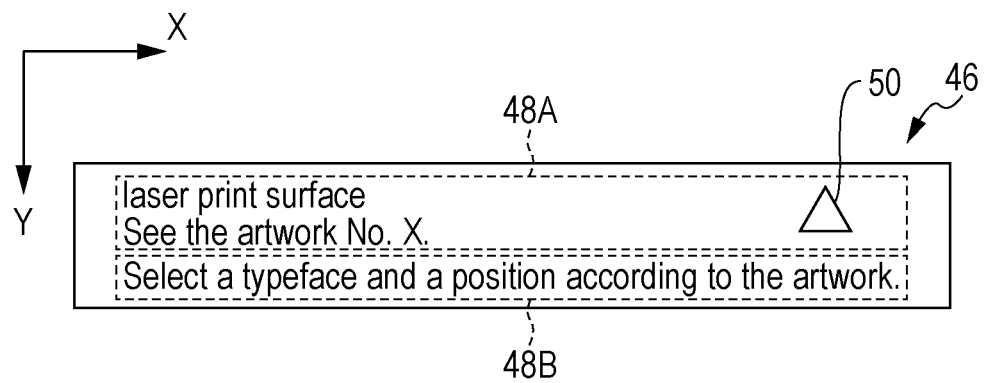
FIG. 5 is a front view of exemplary sets of sentences in a text area, according to an exemplary embodiment.

In this case, for example, as illustrated in FIG. 5, the first and second lines of the text 48 and the target object 50 in the text area 46 may be recognized to be a single text (one-line text) 48A, and the third line of the text 48 may be recognized to be a single text (one-line text) 48B.

The image analysis apparatus according to the first exemplary embodiment extracts, from a target image, a text area which is an area including characters, and obtains a predetermined target-object condition. The image analysis apparatus searches, in the extracted text area, for a target object satisfying the predetermined target-object condition, excludes the searched target object from the target of character recognition, and recognizes characters in the text area from which the target object has been excluded. The predetermined target-object condition will be described below.

Figure 6:
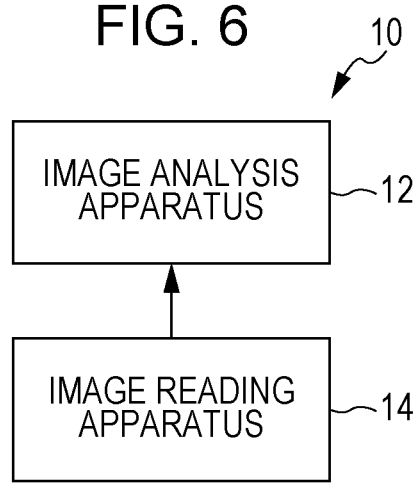
FIG. 6 is a block diagram illustrating a configuration of an image analysis system according to an exemplary embodiment.
Figure 7:
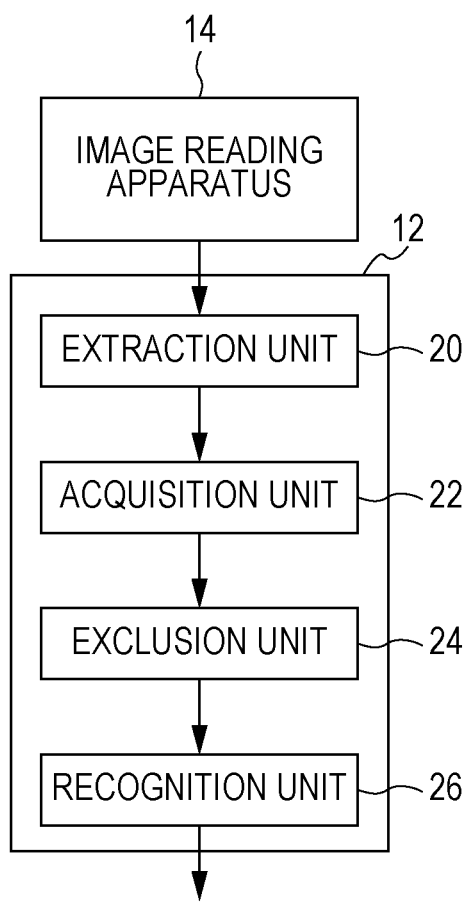
FIG. 7 is a block diagram illustrating functions of the image analysis apparatus according to first and second exemplary embodiments.

The configuration of an image analysis system and the functions of the image analysis apparatus according to the first exemplary embodiment will be described. FIG. 6 is a block diagram illustrating the configuration of an image analysis system 10 according to the first exemplary embodiment. FIG. 7 is a block diagram illustrating the functions of an image analysis apparatus 12 according to the first exemplary embodiment.

As illustrated in FIG. 6, the image analysis system 10 includes the image analysis apparatus 12 and an image reading apparatus 14. The image reading apparatus 14 which is a so-called scanner reads a drawing made on a sheet P, generates color image data or monochrome image data, and outputs the generated image data to the image analysis apparatus 12. As illustrated in FIG. 7, the image analysis apparatus 12 includes functional units, that is, an extraction unit 20, an acquisition unit 22, an exclusion unit 24, and a recognition unit 26.

In terms of the hardware configuration of the image analysis apparatus 12, the image analysis apparatus 12 according to the first exemplary embodiment is implemented through a central processing unit (CPU) controlling the operations of the entire apparatus. That is, the image analysis apparatus 12 includes the CPU, a read only memory (ROM) having stored therein, for example, various programs and various parameters in advance, and a random access memory (RAM) used, for example, as a work area in the CPU's execution of various programs, and a storage unit including a nonvolatile memory such as a flash memory.

The image analysis apparatus 12 includes a communication line interface (I/F) unit receiving/transmitting communication information from/to external apparatuses. The image analysis apparatus 12 also includes an operation display unit which receives user instructions for the image analysis apparatus 12, and which notifies the user of various information, for example, about the operational condition of the image analysis apparatus 12. The operation display unit includes, for example, a display for displaying data, and a keyboard and mouse for inputting data. However, the operation display unit is not limited to this, and may include, for example, a touch-panel display and hardware keys, such as a numeric keypad and a start button. On the touch-panel display, various information and display buttons for receiving operation instructions through execution of programs are displayed.

The extraction unit 20 receives image data from the image reading apparatus 14, and obtains a read image indicated by the received image data, as an image (hereinafter referred to as a "target image") which is the target of character recognition. In the first exemplary embodiment, the case in which the extraction unit 20 receives image data from the image reading apparatus 14 will be described. However, this is not limiting. The image data may be received through the communication line I/F unit from an external apparatus. When image data is stored in the storage unit, the image data may be read from the storage unit.

The extraction unit 20 performs layout analysis on the obtained target image so as to extract text areas included in the target image. In the first exemplary embodiment, to avoid a complicated description, the case in which the target image is obtained by reading, as monochrome image data, a sheet P on which a drawing is made in black with a white background will be described. The extraction unit 20 is an exemplary extraction section.

The extraction unit 20 divides the target image into multiple areas through layout analysis. In this example, the case in which projection is used as an exemplary method of dividing a target image into multiple areas through layout analysis will be described.

That is, the target image is projected in a predetermined first direction (for example, the direction parallel to the X axis). Thus, in the histogram (projected distribution) of the black pixels in the target image, there appear upper peaks corresponding to portions having a large number of black pixels and lower peaks corresponding to portions having a small number of black pixels. When a lower peak portion among the upper and lower peaks satisfies a determination condition for determining a portion at which an area is to be divided, the area is divided in the projection direction. Similarly, the target image is projected in the direction crossing the first direction (for example, the direction parallel to the Y axis). When a lower peak portion among the upper and lower peaks of the histogram of the black pixels in the target image satisfies the determination condition, the area is divided in the projection direction. The division operation in the two directions is recursively performed so that the target image is divided into multiple divided areas.

The extraction unit 20 then discriminates the type of information described in each divided area, on the basis of the components (objects) included in the divided area. The types include a text, a table, and an image. In the example illustrated in FIG. 1, on the basis of the discriminated types, four areas, that is, the text areas 32A and 32B corresponding to texts, the table area 34 corresponding to a table, and the image area 36 corresponding to an image, are discriminated.

The extraction unit 20 then extracts text areas from the discriminated areas. In the example in FIG. 1, two areas, that is, the text area 32A and the text area 32B, are extracted from the four areas.

For example, the acquisition unit 22 reads data which indicates a predetermined target-object condition and which is stored in the storage unit. Thus, the acquisition unit 22 obtains the predetermined target-object condition. The predetermined target-object condition is a condition serving as a reference for determining whether or not, for example, a character, a symbol, or a figure included in a text area is a target object. Examples of the predetermined target-object condition include a condition based on a reference image indicating each target object, a condition based on the arrangement of the lines constituting each target object, and a condition about the height and the like of each target object, which are described below. The acquisition unit 22 is an exemplary acquisition section.

The exclusion unit 24 searches, in a text area extracted by the extraction unit 20, for a target object satisfying the predetermined target-object condition obtained by the acquisition unit 22. The exclusion unit 24 excludes the searched target object from the target of character recognition performed by the recognition unit 26. The exclusion unit 24 is an exemplary exclusion section.

In the first exemplary embodiment, the case in which one of method (1) and method (2) is used as an exemplary method of searching for a target object will be described.

(1) A method in which reference images indicating the target objects that are to be excluded are obtained as the predetermined target-object condition, and in which, for example, a character, a symbol, or a figure similar to one of the obtained reference images is searched for.

(2) A method in which data indicating the arrangements of the lines constituting the target objects that are to be excluded is obtained as the predetermined target-object condition, and in which, for example, a character, a symbol, or a figure similar to one of the line arrangements indicated by the obtained data is searched for.

The case in which the method (1) is used to search for a target object will be described.

Figure 8:
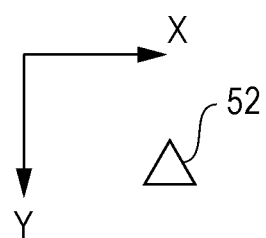
FIG. 8 is a schematic diagram illustrating an exemplary reference image indicating a target object, according to an exemplary embodiment.

The acquisition unit 22 obtains a reference image 52 indicating a target object that is to be excluded, as the predetermined target-object condition. For example, when the acquisition unit 22 is to exclude a triangular symbol such as the target object 42 illustrated in FIG. 2, for example, the acquisition unit 22 obtains the reference image 52 indicating a triangular symbol as illustrated in FIG. 8.

The exclusion unit 24 extracts a character candidate area corresponding to a character, a symbol, a figure, or the like from the text area, for example, through binarization or labeling. The exclusion unit 24 calculates the similarity between the extracted character candidate area and the reference image 52. Examples of a method of calculating a similarity include the sum of absolute difference (SAD) and the zero-means normalized cross-correlation (ZNCC) which are similarity indexes that are typically used in pattern matching techniques. Another method of calculating a similarity is, for example, a method in which each area to be subjected to calculation is divided into multiple areas (for example, multiple 5×5 grid areas); a similarity of each divided area is calculated, for example, on the basis of the presence of a line, the length of the line, and the orientation of the line in the divided area; and the calculated similarities are added together.

Examples of the orientation of a line include a horizontal-direction line (a line parallel to the X direction), a vertical-direction line (a line parallel to the Y direction), a slanting line extending from lower left to upper right (a line such that, as the X-direction value is increased, the Y-direction value is increased), and a slanting line extending from upper left to lower right (a line such that, as the X-direction value is increased, the Y-direction value is decreased). However, any known method which is typically used may be used as a method of calculating a similarity.

At that time, at least one of the extracted character candidate area and the reference image 52 may be enlarged or reduced so that the size of the extracted area and the size of the reference image 52 are equal to each other or so that the extracted area and the reference image 52 are easily compared with each other.

When the calculated similarity is equal to or more than a threshold, the exclusion unit 24 determines, for example, a character, a symbol, or a figure described in the extracted area, to be the target object, and excludes, for example, the character, the symbol, or the figure from the target of character recognition performed by the recognition unit 26.

The case in which a target object is searched for by using the method (2) will be described.

Figure 9:
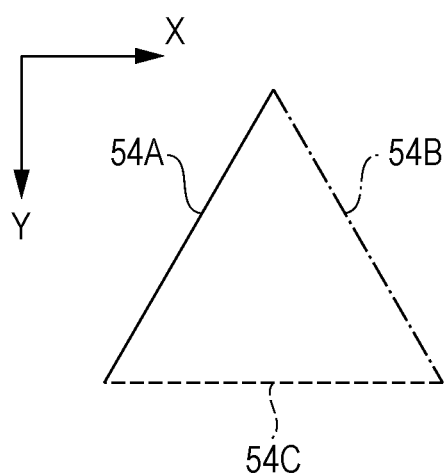
FIG. 9 is a schematic diagram illustrating an exemplary arrangement of lines constituting a target object, according to an exemplary embodiment.

The acquisition unit 22 obtains data indicating the arrangement of the lines constituting a target object that is to be excluded, as the predetermined target-object condition. For example, when a triangular symbol such as the target object 42 illustrated in FIG. 1 is to be excluded, the acquisition unit 22 obtains data indicating the arrangement of the three lines constituting a triangle, for example, as illustrated in FIG. 9. In the example in FIG. 9, data indicating that three lines (a) to (c) described below are arranged is obtained. Thus, only components included in the target image are used to search for a target object.

(a) A slanting line 54A extending from lower left to upper right is arranged in a left area in an area for calculating a similarity.

(b) A slanting line 54B extending from upper left to lower right is arranged in a right area in the area for calculating a similarity.

(c) A line 54C extending in the horizontal direction is arranged in a lower area in the area for calculating a similarity.

The exclusion unit 24 extracts a character candidate area corresponding to a character, a symbol, a figure, or the like from a text area, for example, through binarization or labeling. In addition, the exclusion unit 24 calculates a similarity between the arrangement of the lines included in the extracted character candidate area and the arrangement of the lines constituting the target object that is to be excluded. The method of calculating a similarity may be a known method which is typically used. In addition, when the calculated similarity is equal to or more than a threshold, the exclusion unit 24 determines the symbol or the character described in the extracted area, to be the target object, and excludes the symbol or the character from the target of character recognition performed by the recognition unit 26.

Figure 10A:
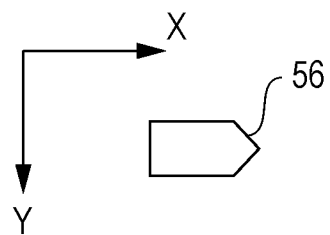
FIG. 10A is a schematic diagram illustrating another exemplary reference image indicating a target object, according to an exemplary embodiment.
Figure 10B:
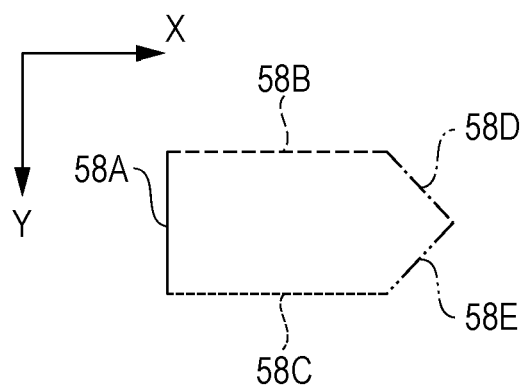
FIG. 10B is a schematic diagram illustrating another exemplary arrangement of lines constituting a target object, according to an exemplary embodiment.

In the first exemplary embodiment, the case of a triangular target object is described. However, the shape of a target object is not limited to this. For example, in the case where a pentangular symbol is to be excluded and where the method (1) is used, for example, a reference image 56, as illustrated in FIG. 10A, indicating a pentangular symbol is obtained. For example, in the case where a pentangular symbol is to be excluded and where the method (2) is used, for example, data, as illustrated in FIG. 10B, indicating that five lines (d) to (h) described below are arranged is obtained.

(d) A line 58A extending in the vertical direction is arranged in a left area in an area for calculating a similarity.

(e) A line 58B extending in the horizontal direction is arranged in an upper area in the area for calculating a similarity.

(f) A line 58C extending in the horizontal direction is arranged in a lower area in the area for calculating a similarity.

(g) A slanting line 58D extending from upper left to lower right is arranged in an upper right area in the area for calculating a similarity.

(h) A slanting line 58E extending from lower left to upper right is arranged in a lower right area in the area for calculating a similarity.

Figure 11:
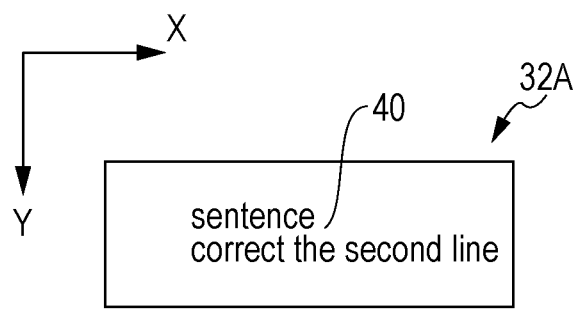
FIG. 11 is a front view of an exemplary text area from which a target object is deleted, according to an exemplary embodiment.

For example, as illustrated in FIG. 11, the exclusion unit 24 deletes the target object 42 from the text area 32A. Thus, the exclusion unit 24 excludes the target object 42 from the target of character recognition performed by the recognition unit 26. Accordingly, in character recognition of the text area 32A, the text 40 in the text area 32A is subjected to character recognition.

In the first exemplary embodiment, the case where, in the entire text area, a target object satisfying the predetermined target-object condition which is obtained by the acquisition unit 22 is searched for and where the searched target object is excluded from the target of character recognition performed by the recognition unit 26 is described. However, this is not limiting. In a search area which is a portion of the text area, a target object satisfying the predetermined target-object condition obtained by the acquisition unit 22 may be searched for, and the searched target object may be excluded from the target of character recognition performed by the recognition unit 26.

In the first exemplary embodiment, the search area is an area, in the text area, in which it is predicted that a target object is included. For example, a target object such as a symbol about a revision matter is often arranged in an end area including the right end or in an end area including the left end in the text area, for example, as illustrated in FIGS. 2 and 4.

Figure 12A:
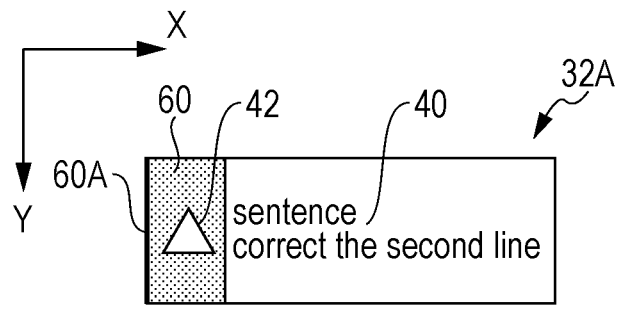
FIG. 12A is a schematic diagram illustrating an exemplary area in which a target object is searched for, according to an exemplary embodiment.

Therefore, for example, as illustrated in FIG. 12A, in an end area 60 (an area indicated by using dots in FIG. 12A) which is a portion of the text area and which includes a left end 60A of the text area 32A, a target object satisfying the predetermined target-object condition obtained by the acquisition unit 22 may be searched for. The end area 60 is an exemplary search area.

Figure 12B:
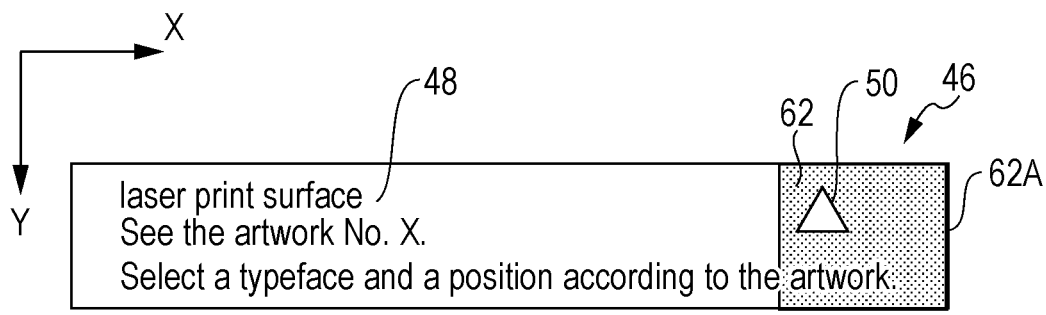
FIG. 12B is a schematic diagram illustrating another exemplary area in which a target object is searched for, according to an exemplary embodiment.

Alternatively, for example, as illustrated in FIG. 12B, in an end area 62 (an area indicated by using dots in FIG. 12B) which is a portion of the text area and which includes a right end 62A of the text area 46, a target object satisfying the predetermined target-object condition obtained by the acquisition unit 22 may be searched for. The end area 62 is an exemplary search area. The search area is not limited to the end area 62 illustrated in FIG. 12B. Searching may be performed in the right end of one-line texts described in the text area 46.

Figure 12C:
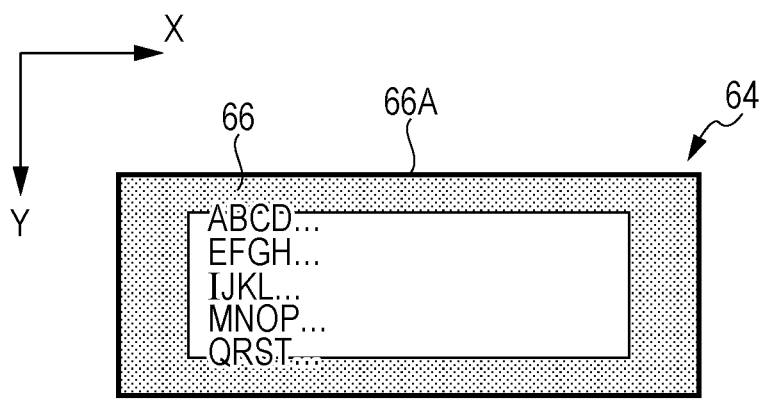
FIG. 12C is a schematic diagram illustrating another exemplary area in which a target object is searched for, according to an exemplary embodiment.

Alternatively, for example, as illustrated in FIG. 12C, in an outline area 66 (an area indicated by using dots in FIG. 12C) which is a portion of the text area and which includes the outline 66A of the text area 64, a target object satisfying the predetermined target-object condition obtained by the acquisition unit 22 may be searched for. The outline area 66 is an exemplary search area.

Further, a target object may be searched for by determining whether or not at least one of the following objects satisfies the predetermined target-object condition: an object, such as a character, a symbol, or a figure positioned on the rightmost area of the text area; and an object, such as a character, a symbol, or a figure positioned on the leftmost area of the text area. In this case, it is determined that, for example, a character, a symbol, or a figure determined to be closest to an end of the text area and to satisfy the predetermined target-object condition is determined to be a target object. Thus, regardless of an area, such as an end area or an outline area in the text area, a target object is searched for on the basis of the arrangement of, for example, a character, a symbol, or a figure in the text area.

When the exclusion unit 24 excludes target objects, the recognition unit 26 performs character recognition on the text areas from which the target objects have been excluded by the exclusion unit 24. In the case where a target object is not found in the text area and where the exclusion unit 24 does not exclude a target object, the recognition unit 26 performs character recognition on the text area extracted by the extraction unit 20. The recognition unit 26 is an exemplary recognition section.

Figure 13:
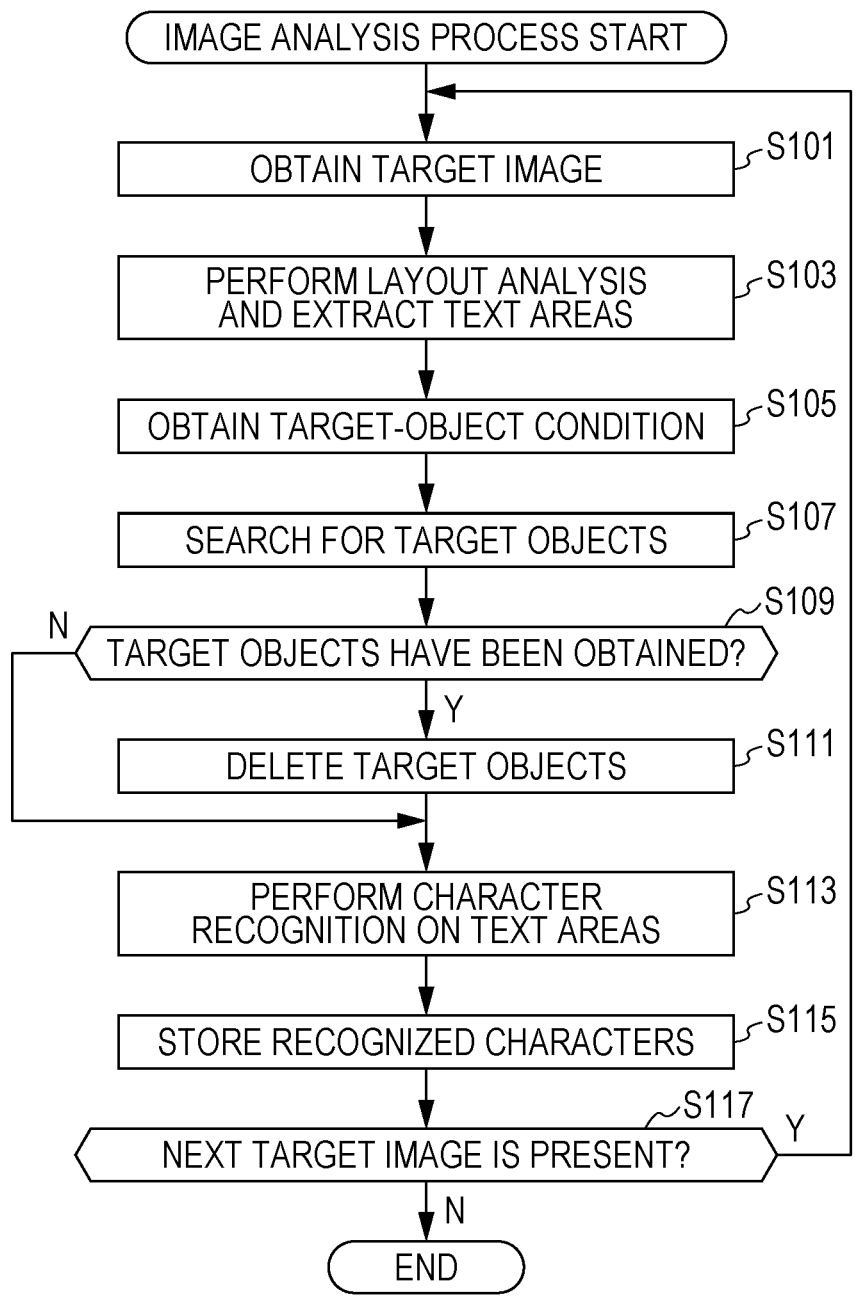
FIG. 13 is a flowchart of an image analysis process according to the first exemplary embodiment.

The flow of an image analysis process performed by the image analysis apparatus 12 according to the first exemplary embodiment when a predetermined execution instruction is given will be described by referring to the flowchart in FIG. 13. In the first exemplary embodiment, the programs for the image analysis process are stored in advance in the storage unit. However, this is not limiting. For example, the programs for the image analysis process may be received from an external apparatus through the communication line I/F unit and may be stored in the storage unit. Alternatively, the programs for the image analysis process which are recorded in a recording medium such as a compact disc-read-only memory (CD-ROM) may be read through a CD-ROM drive or the like so that the image analysis process is performed.

In step S101, the extraction unit 20 receives image data from the image reading apparatus 14 so as to obtain a target image.

In step S103, the extraction unit 20 performs layout analysis on the received target image so as to extract text areas in the target image.

In step S105, the acquisition unit 22 acquires the predetermined target-object condition.

In step S107, the exclusion unit 24 searches, in an extracted text area, for target objects satisfying the obtained predetermined target-object condition.

In step S109, the exclusion unit 24 determines whether or not target objects have been obtained through the searching in the extracted text area. If the exclusion unit 24 determines that target objects have been obtained through the searching in step S109 (Y in S109), the process proceeds to step S111. If the exclusion unit 24 determines that no target objects have been obtained through the searching in step S109 (N in S109), the process proceeds to step S113.

In step S111, the exclusion unit 24 excludes the searched target objects from the target of character recognition.

In step S113, the recognition unit 26 performs character recognition on the text area from which the target objects have been excluded.

In step S115, the recognition unit 26 stores information about the recognized characters, as recognition information in the storage unit.

In step S117, the extraction unit 20 determines whether or not a next target image is present. If the extraction unit 20 determines that a next target image is present in step S117 (Y in S117), the process proceeds to step S101, and the processes in steps S101 to S117 are performed on the next target image. If the extraction unit 20 determines that a next target image is not present (N in S117), execution of the programs for the image analysis process is ended.

Thus, in the first exemplary embodiment, text areas which are areas including characters are extracted from a target image, and the predetermined target-object condition is obtained. In the extracted text areas, target objects satisfying the predetermined target-object condition are searched for. The target objects are excluded from the target of character recognition. Character recognition is performed on the text areas from which the target objects have been excluded. In exclusion of target objects from the target of character recognition, the searched target objects are deleted from the text areas, and character recognition is performed on the text areas from which the target objects have been deleted.

In the first exemplary embodiment, the case in which a target object satisfying the predetermined target-object condition is searched for is described. However, this is not limiting. A target-object arrangement condition about an area in which a target object is arranged in a text area may be obtained. A target object of which the arrangement area in the text area satisfies the target-object arrangement condition may be excluded from the target of character recognition. Examples of the target-object arrangement condition include a state in which the target object is arranged in the outline area 66 including the outline of the text area, and the state in which the target object is arranged in the end area 60 or 62 including an end of the text area.

Second Exemplary Embodiment

An image analysis apparatus according to a second exemplary embodiment will be described.

In the first exemplary embodiment, the case in which, by deleting all target objects in a text area, the target objects are excluded from the target of character recognition performed by the recognition unit 26 is described. In contrast, in the second exemplary embodiment, the case in which only target objects satisfying a condition about one of the height, the size, and the position (hereinafter referred to as a "condition about the height and the like") are deleted among the target objects in a text area, and in which the target objects are thus deleted from the target of character recognition performed by the recognition unit 26 will be described.

The configuration of the image analysis apparatus according to the second exemplary embodiment is the same as that of the image analysis apparatus 12 according to the first exemplary embodiment, and the configuration of the components will not be described.

The flow of the image analysis process performed by the image analysis apparatus 12 according to the second exemplary embodiment when a predetermined execution instruction is given will be described by referring to the flowchart in FIG. 14. In the second exemplary embodiment, the programs for the image analysis process are stored in advance in the storage unit. However, this is not limiting. For example, the programs for the image analysis process may be received from an external apparatus through the communication line I/F unit, and may be stored in the storage unit. Alternatively, the programs for the image analysis process which are recorded in a recording medium such as a CD-ROM may be read through a CD-ROM drive or the like so that the image analysis process is performed.

In steps S101 to S103, similar processes to steps S101 to S103 in the first exemplary embodiment are performed.

In step S105, the acquisition unit 22 acquires the predetermined target-object condition. At that time, the acquisition unit 22 acquires the reference image 52, which indicates a target object that is to be excluded, or the arrangement of the lines constituting a target object that is to be excluded. In addition, the acquisition unit 22 acquires the condition about the height and the like. The height of a target object indicates the Y-direction length of the target object. The size of a target object indicates the size of the target object based on at least one of the X-direction length and the Y-direction length of the target object. The position of a target object indicates the position of the target object in the XY coordinates.

The condition about the height and the like indicates a predefined condition stipulating a target object's height, size, and position which do not hinder character recognition of a text in a text area. In the second exemplary embodiment, for example, the condition about the height in the condition about the height and the like indicates that the height of a target object is larger than the height of a character which is the target of character recognition. The condition about the size in the condition about the height and the like indicates that the size of a target object is larger than the size of a character which is the target of character recognition. The condition about the position in the condition about the height and the like indicates that the Y-direction position of a target object is located in a space between lines of a text in the text area. The expression "located in a space between lines" indicates that the range of the height-direction (Y-direction) position of a target object extends across multiple lines. In addition, the height or the size of a character that is the target of character recognition may be stored in the storage unit in advance, or may be calculated on the basis of the height or the size of, for example, the extracted character, symbol, or figure.

In consideration of an error in character recognition, the condition about the height may indicate that the height of the target object 42 is larger than the maximum height, which includes the value of an error, of a character which is the target of recognition. Alternatively, the condition about the height may indicate that the height of the target object 42 is larger than a value with which it has been confirmed that false recognition does not occur in character recognition.

Similarly, in consideration of an error in character recognition, the condition about the size may indicate that the size of the target object 42 is larger than the maximum size, which includes the value of an error, of a character which is the target of recognition. Alternatively, the condition about the size may indicate that the size of the target object 42 is larger than a value with which it has been confirmed that false recognition does not occur in character recognition.

Similarly, in consideration of an error in character recognition, the condition about the position may indicate that the range of the height-direction position of the target object 42 extends across a space between character lines which are the target of recognition. The height-direction (Y-direction) length of a space between character lines is set to the average, the median, the mode, or the minimum of the lengths of spaces between character lines which are the target of recognition. Alternatively, an additional condition that the range of the height-direction position of the target object 42 is larger than the average, the median, the mode, or the minimum of spaces between character lines which are the target of recognition may be added to the condition about the position. Alternatively, the condition about the position may indicate that the range of the height-direction position of the target object 42 falls within the range of the position in which it has been confirmed that false recognition does not occur in character recognition.

In steps S107 to S111, similar processes to steps S107 to S111 in the first exemplary embodiment are performed.

Figure 15A:
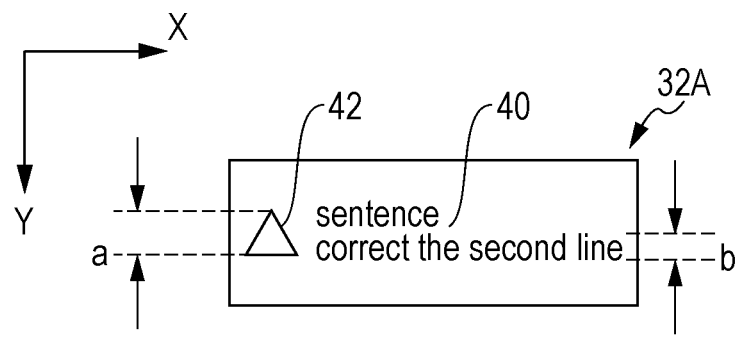
FIG. 15A is a schematic diagram illustrating an example about a height of a target object, according to an exemplary embodiment.

For example, as illustrated in FIG. 15A, when the height 'a' of the target object 42 in the text area 32A is larger than the maximum height 'b' of a character of the text 40 which is the target of recognition, the target object 42 satisfies the condition about the height and the like. Therefore, it is determined that the target object 42 has been found through the searching in the extracted text area 32A.

Figure 15B:
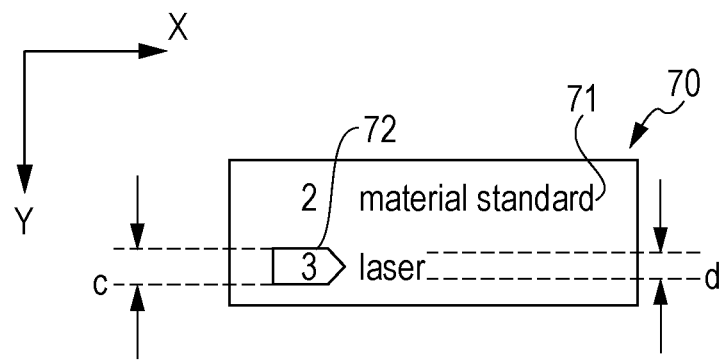
FIG. 15B is a schematic diagram illustrating another example about the height of a target object, according to an exemplary embodiment.

For example, as illustrated in FIG. 15B, when the height 'c' of a target object 72 in a text area 70 is not larger than the maximum height 'd' of a character of a text 71 which is the target of recognition, the target object 72 does not satisfy the condition about the height and the like. Therefore, when other extracted target objects similarly do not satisfy the condition about the height and the like, it is determined that no target objects have been found through the searching in the extracted text area 70.

Figure 16:
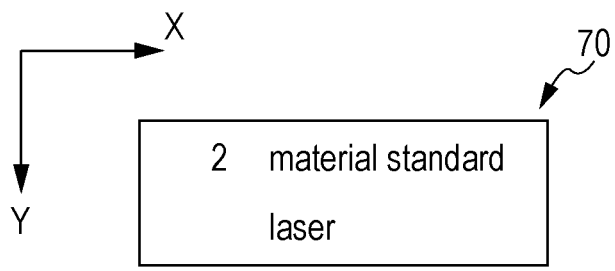
FIG. 16 is a front view of an exemplary text area from which a target object is deleted, according to an exemplary embodiment.

In deletion of the target object 72 from the text area 70, for example, the target object 72 is deleted as illustrated in FIG. 16. Thus, the target object 72 is excluded from the target of character recognition performed by the recognition unit 26.

Figure 17:
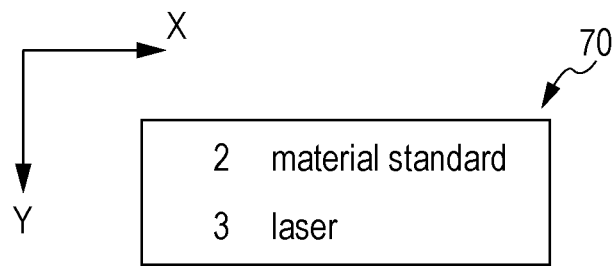
FIG. 17 is a front view of another exemplary text area from which the lines constituting a target object are deleted, according to an exemplary embodiment.

When the target object 72 is searched for on the basis of the arrangement of the lines constituting the target object 72 (when the method (2) is used), for example, only the lines constituting the target object 72 may be deleted as illustrated in FIG. 17. In this case, the character "3" described inside the lines constituting the target object 72 is not deleted. The character "3" is included in the target of character recognition performed by the recognition unit 26.

In steps S113 to S117, similar processes to steps S113 to S117 in the first exemplary embodiment are performed.

Thus, in the second exemplary embodiment, text areas which are areas including characters are extracted from the target image, and the predetermined target-object condition is obtained. In addition, in the extracted text areas, target objects satisfying the predetermined target-object condition are searched for. Among the found target objects, target objects of which at least one of the height, the size, and the position satisfies the condition about the height and the like are excluded from the target of character recognition.

In the second exemplary embodiment, the case in which it is determined whether or not a target object satisfying the predetermined target-object condition satisfies the condition about the height and the like is described. However, this is not limiting. It may be determined whether or not, for example, a character, a symbol, or a figure described in a text area satisfies the condition about the height and the like. In this case, regardless of the predetermined target-object condition, for example, a character, a symbol, or a figure satisfying the condition about the height and the like may be determined to be a target object, and the target object may be excluded from the target of character recognition.

Alternatively, it may be determined whether or not, for example, a character, a symbol, or a figure satisfying the condition about the height and the like satisfies the predetermined target-object condition. Then, for example, the character, the symbol, or the figure satisfying the predetermined target-object condition may be determined to be a target object, and the target object may be excluded from the target of character recognition.

Third Exemplary Embodiment

An image analysis apparatus according to a third exemplary embodiment will be described.

In the first and second exemplary embodiments, the case in which, by deleting a target object in a text area, the target object is excluded from the target of character recognition performed by the recognition unit 26 is described. In contrast, in the third exemplary embodiment, the case in which an area corresponding to a target object in a text area is separated as a non-text area from the text area and in which the target object is thus excluded from the target of character recognition performed by the recognition unit 26 will be described.

The configuration of the image analysis apparatus 12 according to the third exemplary embodiment is the same as that of the image analysis apparatus 12 according to the first and second exemplary embodiments, and the configuration of the components will not be described.

In the third exemplary embodiment, the exclusion unit 24 searches, in a text area extracted by the extraction unit 20, for a target object satisfying the predetermined target-object condition obtained by the acquisition unit 22. The exclusion unit 24 determines an area corresponding to a searched target object to be a non-text area, and separates the non-text area from the text area. Thus, the searched target object is excluded from the target of character recognition performed by the recognition unit 26. The exclusion section 24 is also an exemplary separation section.

Figure 18:
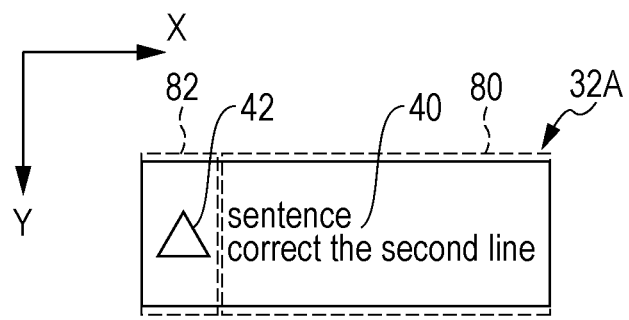
FIG. 18 is a front view of an example of a text area and a non-text area, according to an exemplary embodiment.
Figure 19:
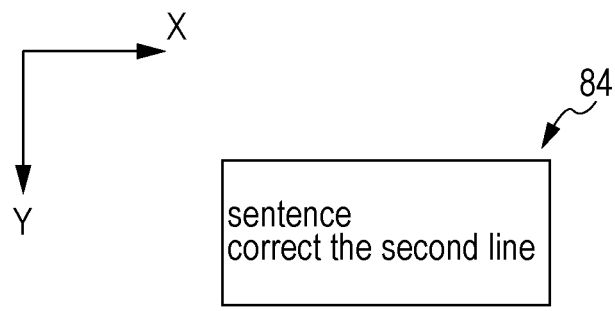
FIG. 19 is a front view of an exemplary text area from which the non-text area is separated, according to an exemplary embodiment.

For example, as illustrated in FIG. 18, when the text 40 and the target object 42 are described in the text area 32A, the exclusion unit 24 recognizes an area 80 corresponding to the text 40 and a non-text area 82 corresponding to the target object 42, and separates the non-text area 82 from the text area 32A. Then, for example, as illustrated in FIG. 19, the exclusion unit 24 uses only the area 80 corresponding to the text 40, as a text area 84.

The method of searching for a target object by using the exclusion unit 24 is similar to the method (1) and the method (2) in the first exemplary embodiment.

Figure 20:
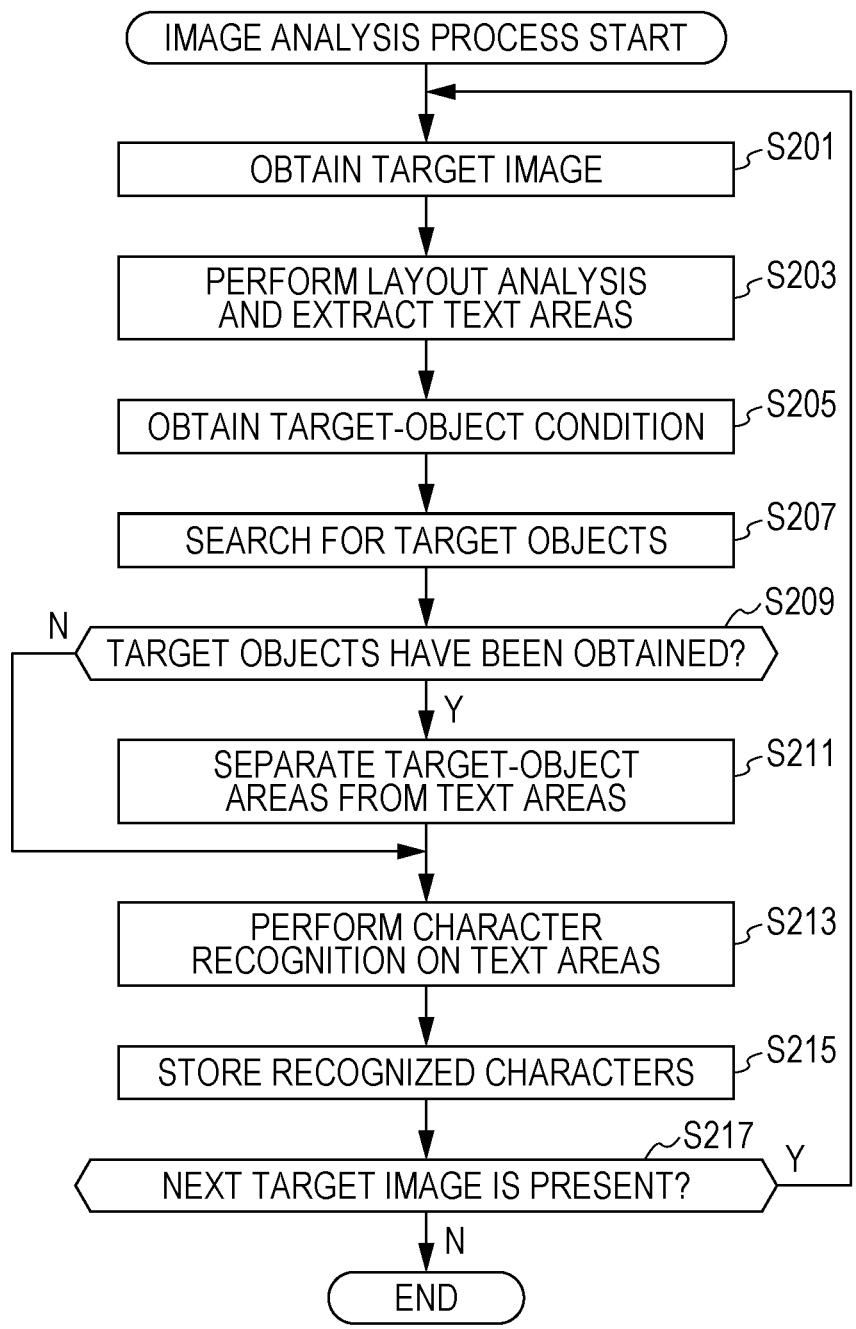
FIG. 20 is a flowchart of an image analysis process according to a third exemplary embodiment.

The flow of an image analysis process performed by the image analysis apparatus 12 according to the third exemplary embodiment when the predetermined execution instruction is given will be described by referring to the flowchart in FIG. 20. In the third exemplary embodiment, the programs for the image analysis process are stored in advance in the storage unit. However, this is not limiting. For example, the programs for the image analysis process may be received from an external apparatus through the communication line I/F unit, and may be stored in the storage unit. Alternatively, the programs for the image analysis process which are recorded in a recording medium such as a CD-ROM may be read through a CD-ROM drive or the like so that the image analysis process is performed.

In steps S201 to S209, similar processes to steps S101 to S109 in the first exemplary embodiment (FIG. 13) or the second exemplary embodiment (FIG. 4) are performed.

In step S211, the exclusion unit 24 determines areas corresponding to the target objects found through the searching, to be non-text areas, and separates the non-text areas from the text areas. Thus, the target objects are excluded from the target of character recognition.

In steps S213 to S217, similar processes to steps S113 to S117 in the first exemplary embodiment (FIG. 13) or the second exemplary embodiment (FIG. 14) are performed.

Thus, an area corresponding to a target object in a text area is determined to be a non-text area, and the non-text area is separated from the text area. Then, character recognition is performed on the text area from which the non-text area has been separated.

The configuration of the image analysis apparatus 12 (see FIGS. 6 and 7) described in the above-described exemplary embodiments is exemplary. That is, needless to say, unnecessary components may be deleted, or new components may be added without departing from the gist of the present invention.

The flows of the processes of various programs described in the above-described exemplary embodiments (see FIGS. 13, 14, and 20) are also exemplary. That is, needless to say, deletion of unnecessary steps, addition of new steps, or switching the process order may be performed without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image analysis apparatus comprising:
an extraction section that extracts, from a target image, a text area including a character;
an acquisition section that acquires a predetermined target-object condition, the predetermined target-object condition defining a target object contained in the extracted text area;
an exclusion section that searches for the target object in the text area and excludes the target object from the text area, the target object satisfying the predetermined target-object condition;
a determination section that determines a target of character recognition to be a remaining portion of the text area after the target object is excluded therefrom; and
a recognition section that performs character recognition on the determined target of character recognition.

2. The image analysis apparatus according to claim 1, wherein the exclusion section deletes the searched target object from the text area; and
wherein the determination section determines the target of character recognition to be a remaining portion of the text area after the target object is deleted therefrom.

3. The image analysis apparatus according to claim 2, wherein the acquisition section acquires an arrangement of lines constituting the target object, and
wherein the exclusion section searches for the target object on a basis of the arrangement of the lines constituting the target object, and deletes the lines constituting the searched target object.

4. The image analysis apparatus according to claim 1, wherein the exclusion section includes a separation section that determines a target-object area to be a non-text area within the extracted text area, and separates the non-text area from the extracted text area, the target-object area corresponding to the target object contained in the extracted text area, and
wherein the determination section determines the target of character recognition to be a remaining portion of the text area after the non-text area is separated therefrom.

5. The image analysis apparatus according to claim 4, wherein the acquisition section acquires an arrangement of lines constituting the target object, and
wherein the separation section searches for the target object by using the arrangement of the lines constituting the target object, determines the target-object area to be the non-text area, and separates the non-text area from the text area, the target-object area corresponding to the target object in the text area.

6. The image analysis apparatus according to claim 1, wherein the acquisition section acquires a reference image indicating the target object, and
wherein the exclusion section searches for the target object by using the reference image, and excludes the target object from the text area, such that the target object is not included in the determined target of character recognition.

7. The image analysis apparatus according to claim 2, wherein the acquisition section acquires a reference image indicating the target object, and
wherein the exclusion section searches for the target object by using the reference image, and excludes the target object from the extracted text area, such that the target object is not included in the determined target of character recognition.

8. The image analysis apparatus according to claim 3, wherein the acquisition section acquires a reference image indicating the target object, and
wherein the exclusion section searches for the target object by using the reference image, and excludes the target object from the extracted text area, such that the target object is not included in the determined target of character recognition.

9. The image analysis apparatus according to claim 4, wherein the acquisition section acquires a reference image indicating the target object, and
wherein the exclusion section searches for the target object by using the reference image, and excludes the target object from the extracted text area, such that the target object is not included in the determined target of character recognition.

10. The image analysis apparatus according to claim 1,
wherein the acquisition section acquires a condition about at least one of a height, a size, and a position of the target object, and
wherein the exclusion section excludes the target object from the text area, such that the target object is not included in the determined target of character recognition, at least one of a height, a size, and a position of the excluded target object satisfying the condition about at least one of the height, the size, and the position of the target object.

11. The image analysis apparatus according to claim 1,
wherein the acquisition section acquires a condition about at least one of a height, a size, and a position of the target object, and
wherein the exclusion section searches for and excludes the target object from the text area, such that the target object is not included in the determined target of character recognition, the excluded target object being obtained through the searching performed by the exclusion section, at least one of a height, a size, and a position of the excluded target object satisfying the condition about at least one of the height, the size, and the position of the target object.

12. The image analysis apparatus according to claim 10,
wherein the condition about at least one of the height, the size, and the position of the target object is at least one of first to third conditions, the first condition indicating that the height of the target object is larger than a height of a character that is the target of character recognition performed by the recognition section, the second condition indicating that the size of the target object is larger than a size of a character that is the target of character recognition performed by the recognition section, and the third condition indicating that a height-direction position of the target object is located between lines of a text in the text area.

13. The image analysis apparatus according to claim 11,
wherein the condition about at least one of the height, the size, and the position of the target object is at least one of first to third conditions, the first condition indicating that the height of the target object is larger than a height of a character that is the target of character recognition performed by the recognition section, the second condition indicating that the size of the target object is larger than a size of a character that is the target of character recognition performed by the recognition section, and the third condition indicating that a height-direction position of the target object is located between lines of a text in the text area.

14. The image analysis apparatus according to claim 1,
wherein the acquisition section acquires a condition about an arrangement area, as the predetermined target-object condition, the arrangement area being an area in which the target object is arranged in the text area, and
wherein the exclusion section excludes the target object from the text area, such that the target object is not included in the determined target of character recognition, an arrangement area of the excluded target object satisfying the condition about the arrangement area.

15. The image analysis apparatus according to claim 1,
wherein the acquisition section acquires a search area, the search area being a portion of the extracted text area, and
wherein the exclusion section searches for the target object in the search area.

16. The image analysis apparatus according to claim 15,
wherein the search area includes an end of the extracted text area.

17. A non-transitory computer readable medium storing a program causing a computer to function as the sections of the image analysis apparatus according to claim 1.

18. An image analysis method comprising:
extracting, from a target image, a text area including a character;
acquiring a predetermined target-object condition, the predetermined target-object condition defining a target object contained in the extracted text area;
searching for the target object in the extracted text area and excluding the target object from the text area, the target object satisfying the predetermined target-object condition;
determining a target of character recognition to be a remaining portion of the text area after the target object is excluded therefrom; and
performing character recognition on the determined target of character recognition.

19. An image analysis apparatus comprising:
an extraction section that extracts, from a target image, a text area including a character;
an acquisition section that acquires a predetermined target-object condition, the predetermined target-object condition defining a target object contained in the extracted text area;
an exclusion section that searches for the target object satisfying the predetermined target-object condition in the text area and excludes the target object from a target of character recognition in the text area, with the proviso that
the target object satisfies the predetermined target-object condition when at least a height or a size of the target object is determined to exceed a height or a size of the character included in the text area; and
a recognition section that performs character recognition on a remaining portion of the text area after the target object is excluded therefrom.

* * * * *